(12) United States Patent
Smaragdis et al.

(10) Patent No.: US 8,954,175 B2
(45) Date of Patent: Feb. 10, 2015

(54) USER-GUIDED AUDIO SELECTION FROM COMPLEX SOUND MIXTURES

(75) Inventors: Paris Smaragdis, Brookline, MA (US); Gautham J. Mysore, Stanford, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1057 days.

(21) Appl. No.: 12/548,291

(22) Filed: Aug. 26, 2009

(65) Prior Publication Data
US 2013/0121511 A1    May 16, 2013

Related U.S. Application Data

(60) Provisional application No. 61/165,363, filed on Mar. 31, 2009.

(51) Int. Cl.
| | | |
|---|---|---|
| G06F 17/00 | (2006.01) | |
| H04B 1/00 | (2006.01) | |
| G10L 25/48 | (2013.01) | |
| G10L 21/0272 | (2013.01) | |
| G10H 1/36 | (2006.01) | |

(52) U.S. Cl.
CPC H04B 1/00 (2013.01); G10L 25/48 (2013.01); G10L 21/0272 (2013.01); G10H 1/361 (2013.01); G10H 2210/056 (2013.01)
USPC .......................................................... 700/94

(58) Field of Classification Search
CPC .................... G06F 17/30743; G06F 17/30758; G06F 17/30769; G06K 9/6226; G06K 9/00563; G06K 9/6247; G10H 2210/031; G10H 2240/141

USPC ............ 700/94; 84/627, 663; 381/94.2, 94.3, 381/94.8, 98, 101, 106
See application file for complete search history.

(56) References Cited

U.S. PATENT DOCUMENTS

| | | | | |
|---|---|---|---|---|
| 6,148,086 | A * | 11/2000 | Ciullo et al. .................. | 381/106 |
| 2005/0042591 | A1* | 2/2005 | Bloom et al. ............. | 434/307 A |
| 2008/0010038 | A1* | 1/2008 | Smaragdis et al. .......... | 702/181 |
| 2009/0132077 | A1* | 5/2009 | Fujihara et al. ................. | 700/94 |
| 2009/0299665 | A1* | 12/2009 | Irizarry .......................... | 702/76 |

OTHER PUBLICATIONS

Smaragdis, P. 1998. "Blind separation of convolved mixtures in the frequency domain," in Neurocomputing, vol. 22, pp. 21-34.
(Continued)

*Primary Examiner* — Andrew C Flanders
(74) *Attorney, Agent, or Firm* — Wolfe-SBMC (57) ABSTRACT

A system and method are described for selecting a target sound object from a sound mixture. In embodiments, a sound mixture comprises a plurality of sound objects superimposed in time. A user can select one of these sound objects by providing reference audio data corresponding to a reference sound object. The system analyzes the audio data and the reference audio data to identify a portion of the audio data corresponding to a target sound object in the mixture that is most similar to the reference sound object. The analysis may include decomposing the reference audio data into a plurality of reference components and the sound mixture into a plurality of components guided by the reference components. The target sound object can be re-synthesized from the target components.

20 Claims, 6 Drawing Sheets

(56) References Cited

OTHER PUBLICATIONS

H. Sawada, S. Araki, R. Mukai, S. Makino. 2007. "Grouping Separated Frequency Components by Estimating Propagation Model Parameters in Frequency-Domain Blind Source Separation," IEEE Trans. Audio, Speech, and Language Processing, vol. 15, No. 5, pp. 1592-1604.

Yilmaz, O., and S. Rickard, 2004. "Blind Separation of Speech Mixtures via Time-Frequency Masking," in IEEE Trans. on Signal Processing, vol. 52, No. 7, pp. 1830-1847.

Roweis, S.T. 2003. "Factorial Models and Reiltering for Speech Separation and Denoising," in proceedings of Eurospeech 2003 Geneva, Switzerland.

T. Virtanen, A. Mesaros, M. Ryynanen. 2008. "Combining Pitch-Based Inference and Non-Negative Spectrogram Factorization in Separating Vocals from Polyphonic Music," Statistical and Perceptual Audition workshop, Interspeech 2008, Brisbane, Australia.

Smaragdis, P., B. Raj, and M.V. Shashanka. 2007. "Supervised and Semi-Supervised Separation of Sounds from Single Channel Mixtures." In proceedings of the 7th International Conference on Independent Component Analysis and Signal Separation. London, UK.

Casey, M. and Westner, A. "Separation of Mixed Audio Sources by Independent Subspace Analysis" in proceedings ICMC 2000.

Roweis, S.T. "One Microphone Source Separation" in NIPS 2000.

* cited by examiner

USER-GUIDED AUDIO SELECTION FROM COMPLEX SOUND MIXTURES

This application claims benefit of priority to U.S. Provisional Patent Application No. 61/165,363, filed Mar. 31, 2009. The preceding provisional application is incorporated herein by reference in its entirety. To the extent that material in the Provisional Application conflicts with material expressly set forth herein, the material expressly set forth herein controls.

BACKGROUND

Editing and manipulating audio signals presents a unique challenge. Whereas it is relatively simple to outline an object in a photograph, or even in a video stream, doing so in an audio track is not so straightforward, particularly when mixtures of sounds are involved. For example, recorded audio data of music or other real-world sources often contain a superposition of multiple sounds that occur simultaneously.

Makers of audio processing software have spent significant resources on developing techniques for visualizing audio data in forms that help a user understand and manipulate it. The most widespread representation for audio is the trace of the actual air pressure across time, which is often referred to as the waveform.

While the waveform representation provides accurate visualization of sound, unfortunately, it only conveys a small amount of information. An experienced user might be able to deduce some basic information using this representation, but in the case of most sound mixtures there is very little information to be found.

Another approach for visualizing audio data is time-frequency visualizations (often referred to as frequency or spectral representations). Time-frequency decompositions are a family of numerical transforms that allow one to display any time series (like sound) in terms of its time-varying frequency energy content. The most common of these representations is the spectrogram, which one can readily find in many modern audio processing editors. More exotic time-frequency transforms, such as wavelets, warped spectrograms and sinusoidal decompositions have also been used, but they effectively communicate the same information to a user. Common to all these visualizations is the ability to show how much acoustic energy exists at a specific point in time and frequency. Since different sounds tend to have different distributions along that space, it is often possible to visually distinguish mixed sounds using such visualizations.

Although such representations may be occasionally informative for expert users, they do not facilitate an object-based interaction with audio, such as allowing a user to select, modify, or otherwise interact with particular sounds from a sound mixture.

SUMMARY

A system and method are described for allowing selection of a target sound object from a sound mixture (e.g., a singer's voice from a musical recording that includes a plurality of instruments). In some embodiments, a sound mixture may comprise a plurality of sound objects superimposed in time. For example, a user can select one of these sound objects by providing reference audio data corresponding to a reference sound object. In some examples, a user may record the reference audio data, such as by speaking into a microphone.

The system described may analyze the audio data and the reference audio data to identify a portion of the audio data corresponding to a target sound object in the mixture that is most similar to the reference sound object. For example, if a user wishes to select the vocals from audio data representing a musical piece, according to some embodiments, the user may record himself singing the vocal section (e.g., using a microphone), and the system may use that recording to select the vocals from the musical piece.

In some embodiments, the analysis may include decomposing the reference audio data into a plurality of reference components (e.g., using a Probabilistic Latent Component Analysis (PLCA)). In some embodiments, the analysis may further include decomposing the sound mixture into a plurality of components guided by the reference components. In some embodiments, decomposing the sound mixture may comprise performing an iterative Expectation-Maximization (EM) algorithm, wherein one or more equations of the EM algorithm is dependent, at least in part, on audio data corresponding to one or more of the reference components.

In some embodiments, after the audio data has been decomposed, the target sound object can be re-synthesized from the target components. In some embodiments, the target sound object may be isolated, the original sound mixture may be played without the target sound object, and/or either may be manipulated via audio editing software.

While the invention is described herein by way of example for several embodiments and illustrative drawings, those skilled in the art will recognize that the invention is not limited to the embodiments or drawings described. It should be understood that the drawings and detailed description hereto are not intended to limit the invention to the particular form disclosed, but on the contrary, the invention is to cover all modifications, equivalents and alternatives falling within the spirit and scope of the present invention as defined by the appended claims. Any headings used herein are for organizational purposes only and are not meant to limit the scope of the description or the claims. As used herein, the word "may" is used in a permissive sense (i.e., meaning having the potential to) rather than the mandatory sense (i.e. meaning must). Similarly, the words "include", "including", and "includes" mean including, but not limited to.

DETAILED DESCRIPTION OF EMBODIMENTS

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the following detailed description are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Using traditional techniques, selecting sound objects from mixture recordings may be very tedious or even impossible. This presents a significant challenge for an audio-software user who is interested in selecting and/or manipulating a single sound object and/or sound source from a mixture. For example, selecting and/or isolating a singer's voice in a musical recording may allow the user to listen only to the singer's voice, remove the singer's voice from the recording, or to otherwise manipulate the sound (e.g., adjusting pitch).

According to various embodiments, an object-based interaction with digital representations of audio mixtures may be facilitated. Rather than forcing a user to rely solely on a graphical representation of the sound mixture, according to various embodiments, a user may be able to specify one or more sound objects of the mixture using audio guidance. According to various embodiments, a user may provide a reference sound object (e.g., sounds over a period of time) that corresponds at least roughly to one or more target sound objects of a sound mixture. In embodiments, the system may be configured to identify, isolate, and/or allow the user to manipulate the sound object(s) of the mixture that correspond to the reference sound object. For example, according to some embodiments, a user may select a singer's voice from a song recording by singing, humming, whistling, or otherwise mimicking the singer's vocals into a microphone, thus allowing the system to identify the singer's voice as the target sound object.

After identifying a sound object (e.g., the singer's voice in a musical recording), the user may interact with the sound object. For example, the user may isolate the selected sound object and listen to only that sound object (e.g., only to the singer's voice). Alternatively, by selecting a given sound object, a user may listen to an audio recording with the sound object removed (e.g., the musical recording without the selected voice component).

As used herein, the term sound object may be used to refer to a time varying series of sounds that may be identifiable as a distinct element in a sound mixture. The term sound mixture may be used to refer to an audio signal resulting from a superimposition of a plurality of sound objects in time. For example, a musical recording composed of sound from multiple concurrently playing instruments may be referred to herein as a sound mixture, while the sound of any particular instrument may be referred to herein as a sound object. The term audio recording is used herein to refer to any sound data, whether the sound was actually recorded/captured from a real world source, synthesized, or both.

Figure 1:
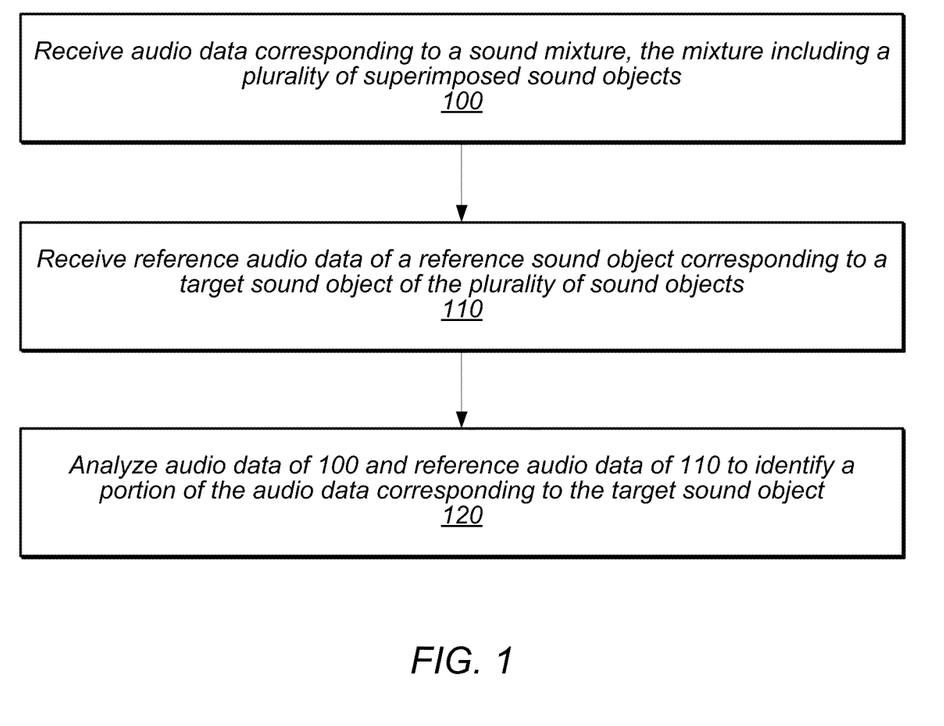
FIG. 1 is a flowchart illustrating a method for selecting a sound object from a sound mixture, according to some embodiments.

FIG. 1 is a flowchart illustrating a method for selecting a sound object from a sound mixture, according to some embodiments. In various embodiments, the illustrated method may be performed by a computer system (such as the one discussed below). In some embodiments, the method may be performed by an audio or audio-editing application. As such, the system may present the user a graphical and/or audio interface for interacting with digital data representing an input audio recording.

According to the embodiment illustrated in FIG. 1, the method may begin by receiving audio data corresponding to a sound mixture, as in 100. For example, the audio data received in 100 may comprise digital data representing a textured audio recording (e.g., a musical recording comprising sound from multiple instruments) in various formats. In the embodiments discussed below, it is assumed that the audio data may be represented as a time-frequency distribution, though various other representations are possible. Various codec (coder-decoder) formats known in the art may be used to represent the audio recording digitally. Additionally, various file formats known in the art may be may be used to store the digital encoding in a compressed (lossy or lossless) or uncompressed format. In various embodiments, audio may be stored according to various sampling rates.

In various embodiments, the audio data may be represented to a user using waveform, time-frequency distribution, and/or other visualization. For example, audio-software may be used to display the audio data to a user using either or both representations. In some embodiments, the audio-software may enable the user to listen to the audio recording, pause, re-play, and/or otherwise manipulate the data.

According to the illustrated embodiment, the method may further comprise receiving reference audio data of a reference sound object, as in 110. In some embodiments, the reference sound object may correspond to a target sound object of the original audio mixture that a user wishes to select. In some embodiments, the reference sound object may correspond to the target sound object by approximating the sound of the target sound object. For example, in some embodiments, the reference sound object may approximate the sound of the target sound object by sharing similar frequency and/or temporal behavior (i.e., time-frequency distributions) with the target sound object. In some embodiments, the reference sound object may approximate the sound of the target sound object more closely than it approximates the sound of any of the other sound objects of the original audio mixture. In various embodiments, different models and/or techniques may be used to determine which of the original sound mixture's sound objects are most closely approximated by the reference sound object; some of these models and techniques are described herein as example embodiments.

In different embodiments, a user may input the reference audio data using a variety of methods. For example, in one embodiment, the user may record himself (e.g., using a microphone) mimicking the target sound object, such as by singing, humming, or whistling. For example, a user wishing to select a singer's voice from a musical recording may sing or hum the vocal portion into a microphone. In various embodiments, the reference audio data may be saved and visually displayed by audio-software.

In some embodiments, the reference audio data may be shorter in time than the original audio data. In such embodiments, a user may be permitted to specify where the two audio data sets overlap in time. In other embodiments, the audio software may determine a best-fit overlap based on the common sound characteristics of the original and reference data.

In some embodiments, audio-software may assist a user in recording the reference audio data by allowing the user to record the reference audio data while listening to the original recording. For example, in one embodiment, a user wishing to select a singer's voice in a musical recording may start by listening to the recording while singing the lyrics into a microphone as they are heard. In such embodiments, the audio-software may automatically determine the temporal overlap of the reference data and the original data based on the temporal correspondence between the portions of the original data that were being played and those of the reference data that were being recorded. In various embodiments, the user may then arbitrarily manipulate the reference data by adjusting it temporally and/or by using any combination of known audio manipulation techniques.

According to the illustrated embodiment of FIG. 1, after receiving both the original audio data (as in 100) and the reference audio data (as in 110), the method may further comprise analyzing the original data and the reference data to identify a portion of the audio data corresponding to a target sound object that is most similar to the reference sound object. For instance, in the example above wherein the user records himself imitating the singer's voice (i.e., creates reference audio data corresponding to the reference audio object), the audio-software may be configured to identify the portion of the song (i.e., portion of the original audio data) corresponding to the singer's voice (i.e., the target sound object), since the singer's voice may be the sound object of the original audio data that is most similar to the reference sound object created by the user.

In various embodiments, the reference sound object may share different characteristics with the target sound object. In some cases, it may only be necessary for the reference sound object to roughly approximate the sound of the target sound object. For example, in one instance a user may vocally imitate a recurring drumbeat or may play an instrument to imitate a vocal sound object, etc. Various temporal and spectral qualities may be considered when determining a target sound object during analysis 120, as described below.

Figure 2:
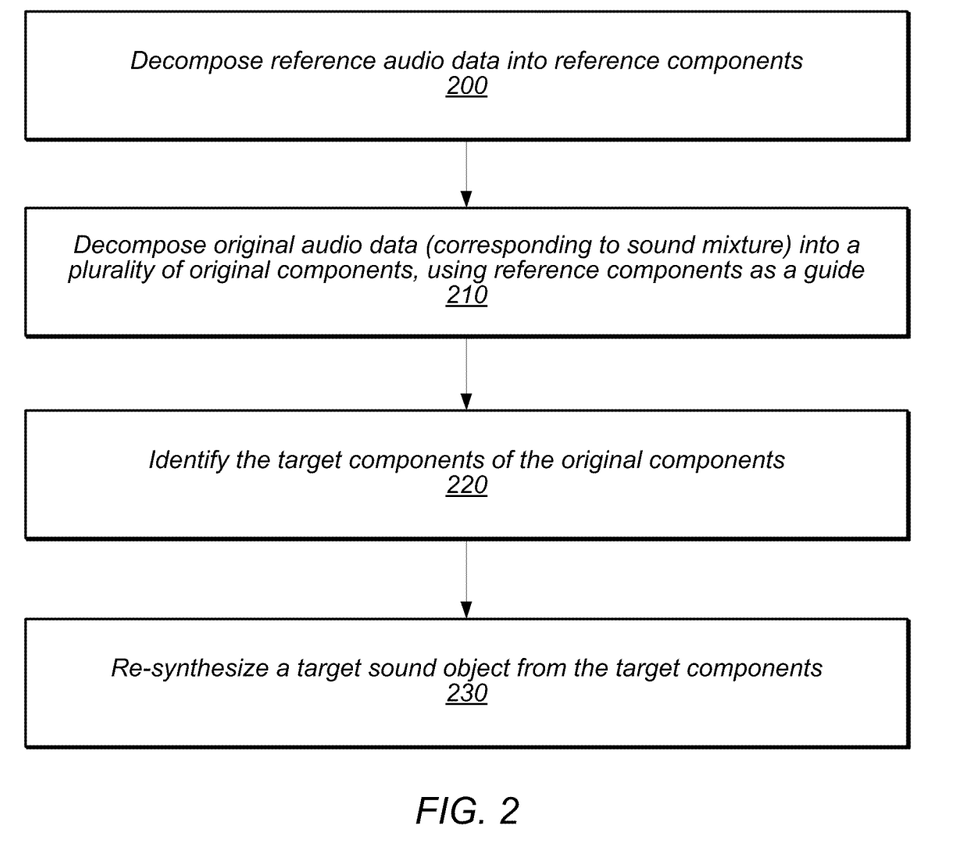
FIG. 2 is a flow diagram illustrating a method for identifying a target sound object from original audio data that is most similar to a reference sound object, according to some embodiments.

FIG. 2 is a flow diagram illustrating a method for identifying a target sound object from original audio data that is most similar to a reference sound object, according to some embodiments. The method may be considered one embodiment of an implementation of step 120 in FIG. 1.

According to the embodiment of FIG. 2, the method of identifying a target audio object given a reference audio object may begin by first decomposing the reference audio data into a plurality of reference components. For example, consider a time-frequency distribution of the reference audio data $P_r(f, t)$ where f is frequency and t is time. In some embodiments, this distribution may be decomposed according to an audio model, such as the Probabilistic Latent Component Analysis (PLCA), such as that described by Smaragdis et. al. in *Supervised and Semisupervised Separation of Sounds from Single-Channel Mixtures*, in proceedings of ICA2007. Intuitively, the PLCA model may operate on the spectrogram representation of the audio data and may learn an additive set of basis functions that represent all the potential spectral profiles one expects from a sound. For example, the time-frequency magnitude distribution P(f, t) may be decomposed as:

$$P(f, t) \approx \sum_{z=1}^{N} P(z)P(f \mid z)P(t \mid z) \tag{1}$$

The model parameters P(f|z), P(t|z), and P(z) can be interpreted as spectral bases, their temporal weights, and basis priors respectively. These functions are indexed by a latent variable z. Thus, P(f|z) may define elements expected to appear in the vertical structure of the input (e.g., sound spectra), P(t|z) may define the corresponding amount of presence at each point in time t, and P(z) may define the overall contribution of these two (i.e., how much presence of each spectral basis exists for each value of z). Effectively, in P(f|z), one may learn frequency distributions used to construct the input mixture, and P(t|z) represents how they appear in time. The constant N defines how many of these pairs are used to approximate the input. Therefore, in the case where N=1, P(f|z) may represent the magnitude spectrum of the input, and P(t|z) its magnitude envelope across time.

Figure 3:
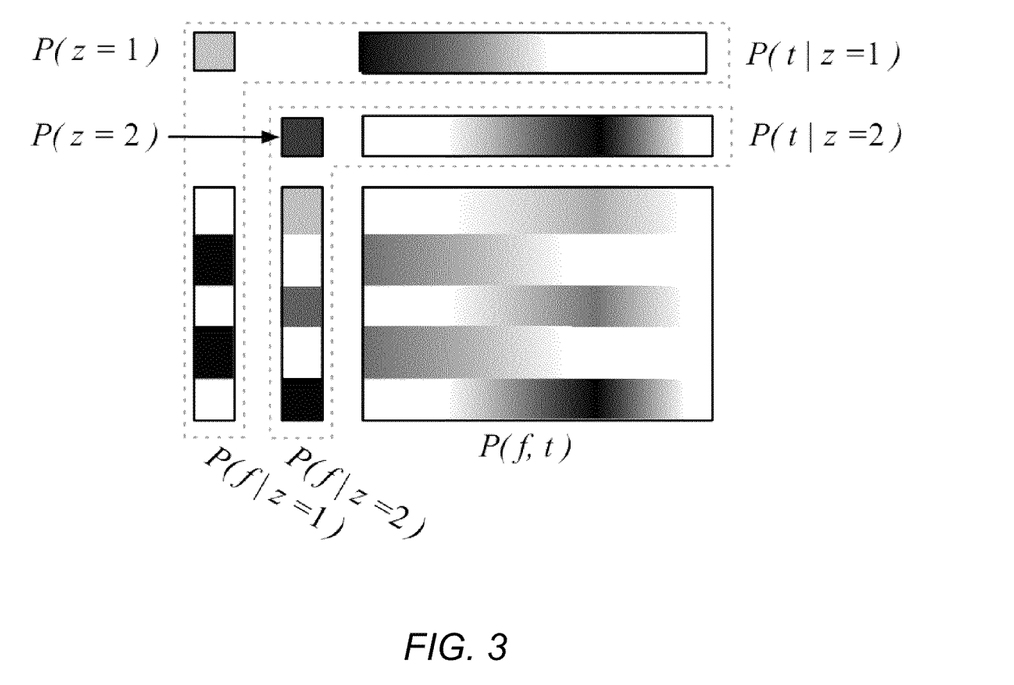
FIG. 3 illustrates an example of a PLCA model analysis on a simplified spectrogram-type input, according to one embodiment.

FIG. 3 illustrates an example of a PLCA model analysis on a simplified spectrogram-type input, according to one embodiment. The input of FIG. 3 is composed of two patterns, one being two parallel tracks with a sharp onset that subsequently fade out, and the other being three parallel tracks which increase in level and then fade out again. Using a rank-2 decomposition (i.e., N=2), FIG. 3 demonstrates that we may obtain a succinct analysis of the input. The two distributions P(f|z) describe the two vertical structures seen. Their corresponding horizontal distributions P(t|z), demonstrate how each P(f|z) is modulated over time. P(z) indicates how much each of these to elements are present overall.

Thus, in some embodiments, step 200 may comprise decomposing reference audio data $P_r(f,t)$ using an M-component PLCA model to extract a set of spectral components $P_r(f|z)$ and their corresponding temporal weights $P_r(t|z)$.

According to the illustrated embodiment of FIG. 2, the method may then comprise decomposing the audio data corresponding to the original sound mixture into a number of components, using the reference components as a guide. In some embodiments, this may be performed using a modified version of the PLCA model that biases the sound decomposition using the reference components derived in 200.

According to some embodiments, the PLCA model may be estimated using the Expectation Maximization (EM) algorithm, resulting in the following series of iterative estimation equations:

$$E\text{-step: } P(z|f,t) = \frac{P(z)P(f|z)P(t|z)}{\sum_z P(z)P(f|z)P(t|z)} \quad (2)$$

$$M\text{-step: } P(f|z) = \frac{\sum_t P(f,t)P(z|f,t)}{\sum_{f,t} P(f,t)P(z|f,t)}$$

$$P(t|z) = \frac{\sum_f P(f,t)P(z|f,t)}{\sum_{f,t} P(f,t)P(z|f,t)}$$

$$P(z) = \frac{\sum_{f,t} P(f,t)P(z|f,t)}{\sum_{z,f,t} P(f,t)P(z|f,t)}$$

As is known in the art, the EM algorithm may be generally used for finding maximum likelihood estimates of parameters in probabilistic models. The EM algorithm is an iterative method that alternates between performing an expectation (E) step, which computes an expectation of the likelihood with respect to the current estimate of the distribution, and a maximization (M) step, which computes the parameters that maximize the expected likelihood found on the E step. These parameters are then used to determine the distribution of the variables in the next E step.

In some embodiments, in order to bias the model towards the reference components, the EM equations may be augmented with the introduction of a priors extension. The distributions P(f|z) and P(t|z) estimated in the PLCA model are multinomial distributions. According to some embodiments, the Dirichlet distribution may be used to introduce an appropriate prior distribution, such as by including a term that blends the current estimate with the prior distribution. Thus, according to one embodiment, the P(f|z) and P(t|z) equations of (2) may be augmented as follows:

$$P(f|z) = \frac{\sum_t P(f,t)P(z|f,t) + K_z\alpha(f|z)}{\sum_{f,t} P(f,t)P(z|f,t) + +K_z\alpha(f|z)} \quad (3)$$

$$P(t|z) = \frac{\sum_f P(f,t)P(z|f,t) + U_z\alpha(t|z)}{\sum_{f,t} P(f,t)P(z|f,t) + U_z\alpha(t|z)}$$

The distribution α above denotes the hyperparameters of the prior distribution. The parameters $K_z$ and $U_z$ may be used to control the degree to which the prior distribution is to be imposed in the estimation process. For example, when K is zero, the model effectively reverts back to the original set of equations displayed in (2). In a model using the modified equations of (3), the prior may effectively bias the results of the estimation of P(f|z) and P(t|z) so that they tend to look more like α(f|z) and α(t|z).

As in 210, the sound mixture $P_m(f,t)$ may be decomposed into a number of components, in a manner guided by the reference components. In some embodiments, such decomposition may be accomplished by modeling the mixture according to the priors-based PLCA model of (2) and (3), wherein α(f|z) and α(t|z) are set to reference distributions $P_r(f|z)$ and $P_r(t|z)$ respectively.

In some embodiments, the sound mixture $P_m(f,t)$ may be decomposed into more components than the reference audio data $P_r(f,t)$. In such embodiments, the reference components $P_r(f|z)$ and $P_r(t|z)$ may be used as priors for an equal number of components of the mixture while the remaining mixture components are estimated without priors. Thus, the process may ensure that each component with the priors gravitates towards a target component that is similar in spectral and temporal characteristics to a reference component provided by the user. In such embodiments, the remaining components (not biased using priors) may capture the remaining sounds that are not targeted for selection.

In some embodiments, the EM algorithm may begin with large bias parameters $K_z$ and $U_z$ and then, as more iterations are performed and the estimated distributions converge, the parameter may be gradually relaxed towards zero. In some instances, such a technique may produce more accurate results by acting as a refining mechanism across iterations of the EM algorithm.

According to the illustrated embodiment, once the sound mixture has been decomposed (e.g., by using the priors-based PLCA model), as in 210, the method may identify the components of the sound mixture that correspond to the reference components (e.g., those derived using the priors), as in 220. These components may be referred to herein as the target components. Once the target components have been extracted and identified, the method may comprise re-synthesizing the target sound object from the target components, as in 230.

Figure 4:
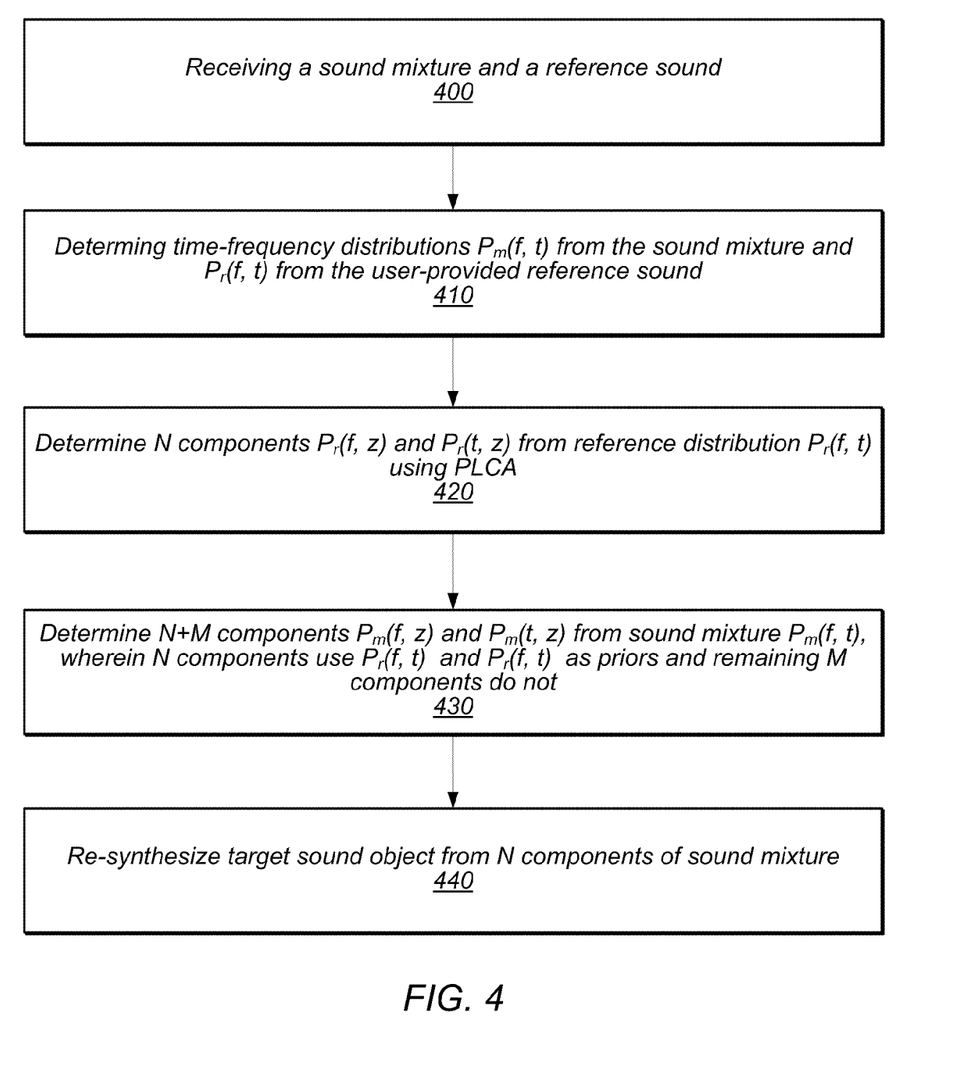
FIG. 4 is a flow diagram illustrating a method for identifying a target sound object from original audio data that is most similar to a reference sound object, according to some embodiments.

FIG. 4 is a flow diagram illustrating a method for identifying a target sound object from original audio data that is most similar to a reference sound object, according to some embodiments. According to the illustrated embodiment, the method may begin by receiving a sound mixture and a reference sound, as in 400, and determining time-frequency distributions for each ($P_m(f,t)$ and $P_r(f,t)$ respectively), as in 410. According to the illustrated embodiment, the method may then comprise using the PLCA model to determine N components $P_r(f|z)$ and $P_r(t|z)$ from the reference distribution $P_r(f,t)$, as in 420.

According to the illustrated embodiment of FIG. 4, the method may further comprise decomposing the sound mixture, as in 430, into N+M components using the prior-modified EM equations of formulas (3) and the N components determined in 420 as the priors. In some embodiments, N components of the sound mixture may each be modeled using priors derived from the reference sound in 420, while the remaining M components may be modeled without the use of priors (e.g., using traditional PLCA equations). In some embodiments, during early iterations of the EM estimation process, relatively larger $K_z$ and $U_z$ values may be used than in later iterations. As such, the affect of the prior distributions may be greater in early iterations of the EM solving than in later iterations.

According to the illustrated embodiment, after sufficient iterations of the EM algorithm have been performed, the method may comprise re-synthesizing the target sound object from the N components of the sound mixture that were biased by the reference-derived priors, as in 440. Recall that only N of the N+M components of the sound mixture are biased by the reference-based priors. Therefore, when applied to the sound mixture, the modified PLCA algorithm may eventually result in two components groups. Components in group $Z1=\{1, \ldots N\}$ of $P_m(f|z)$ and $P_m(t|z)$ may model the time/frequency energy of the target sound and components in group $Z2=\{N+1, \ldots N+M\}$ may model the remainder of the mixture. Given this, the magnitude spectrogram contribution of the target sound object may be approximated by $\Sigma_{Z1} P_m(z)$ $P_m(f|z)P_m(t|z)$ while the remaining non-targeted sounds may be approximated by $\Sigma_{Z2}P_m(z)P_m(f|z)P_m(t|z)$.

However, in some instances, the two submodels may not be guaranteed to explain all of the energy in the original magnitude spectrogram of the original sound mixture. Therefore, in some embodiments, the respective posterior distributions of the two summations may be used to distribute the original input's energy to both submodels. In some embodiments, the following posteriors may be used to modulate the sound mixture $P_m(f,t)$:

$$P(Z1 | f, t) = \frac{\sum_{z' \in Z1} P(z')P(f | z')P(t | z')}{\sum_{z' \in \{Z1,Z2\}} P(z')P(f | z')P(t | z')} \quad (4)$$

$$P(Z2 | f, t) = \frac{\sum_{z' \in Z2} P(z')P(f | z')P(t | z')}{\sum_{z' \in \{Z1,Z2\}} P(z')P(f | z')P(t | z')}$$

The reconstruction of the target and remainder of the mixture may then be $P_m(f,t)P(Z1|f,t)$ and $P_m(f,t)P(Z2|f,t)$. In some embodiments, these two magnitude estimates may be modulated with the phase of the original mixture spectrogram to obtain the two time-series for the target sound object and the rest of the mixture. In some embodiments, before the modulation, an additional binary masking step may be added to further improve audible separation performance. In some embodiments, a hard assignment may be computed for each time/frequency cell to each of the two resulting sounds, for example, by comparing the posterior likelihoods of the two groups and assigning each spectrogram element to the highest likelihood group. In some embodiments, various other frequency and/or temporal masking properties may be imposed, such as by convolving the posteriors with a Gaussian distribution. In such embodiments, this technique may be used to suppress the background sounds.

In some embodiments, rather than re-synthesizing the selected sound object, the audio recording may be re-synthesized as to exclude the selected sound object. For example, this may be done by re-synthesizing each of the M components of the decomposed original sound that do not correspond to the target sound object.

Figure 5:
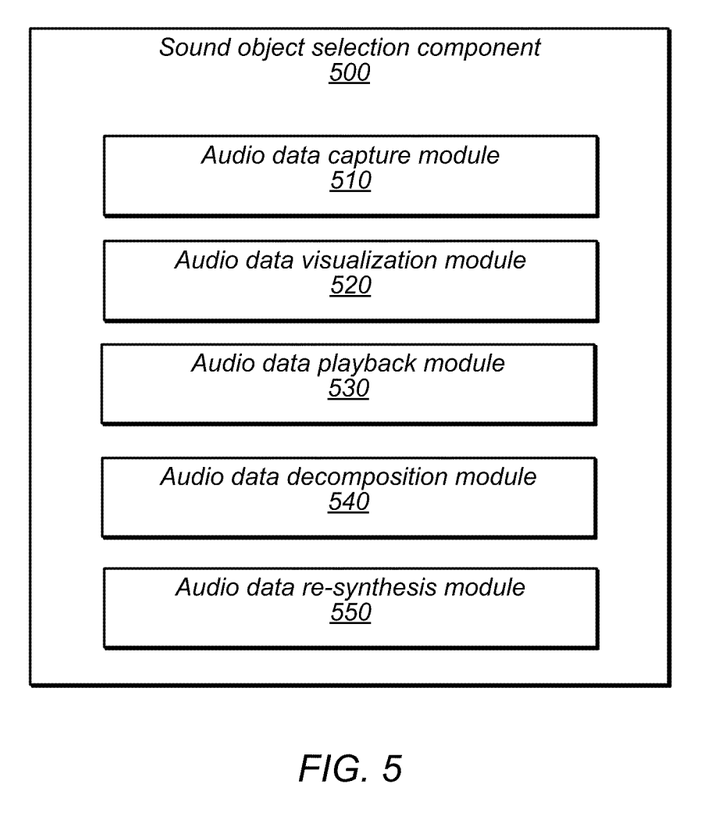
FIG. 5 is a block diagram illustrating a sound object selection component configured to identify a target sound object based on a reference sound object, according to some embodiments.

FIG. 5 is a block diagram illustrating a sound object selection component configured to identify a target sound object based on a reference sound object, according to some embodiments. According to FIG. 5, sound object selection component 500 may comprise audio data capture module 510 for capturing and/or otherwise receiving audio data. For example, according to various embodiments, audio data capture module 510 may be used in conjunction with a microphone to capture a reference sound from a user and/or to receive an original sound mixture from which to extract a target sound object.

According to the illustrated embodiment, selection component 500 may further comprise audio data visualization module 520 for displaying visualizations of audio data, such as an original sound mixture, reference sound object(s), and/or target sound objects. In various embodiments, visualization module 520 may facilitate the visualization of audio data as a waveform, time-frequency distribution, and/or as any other type of visualization. Furthermore, in some embodiments, audio playback module 530 may be used to replay audio data.

According to the illustrated embodiment, selection component 500 may include audio data decomposition module 540 for decomposing audio data, as described herein. For example, in some embodiments, decomposition module 540 may be used to decompose a reference sound into various components according to a PLCA model. In some embodiments, decomposition module 540 may also be used for decomposing a sound mixture into a plurality of components, as described herein, using one or more reference components as a guide (e.g., using a priors-based PLCA model).

According to the illustrated embodiment, selection component 500 may comprise audio data re-synthesis module 550. In such embodiments, re-synthesis module 550 may be used to combine one or more target components into a target sound object, as described above.

Figure 6:
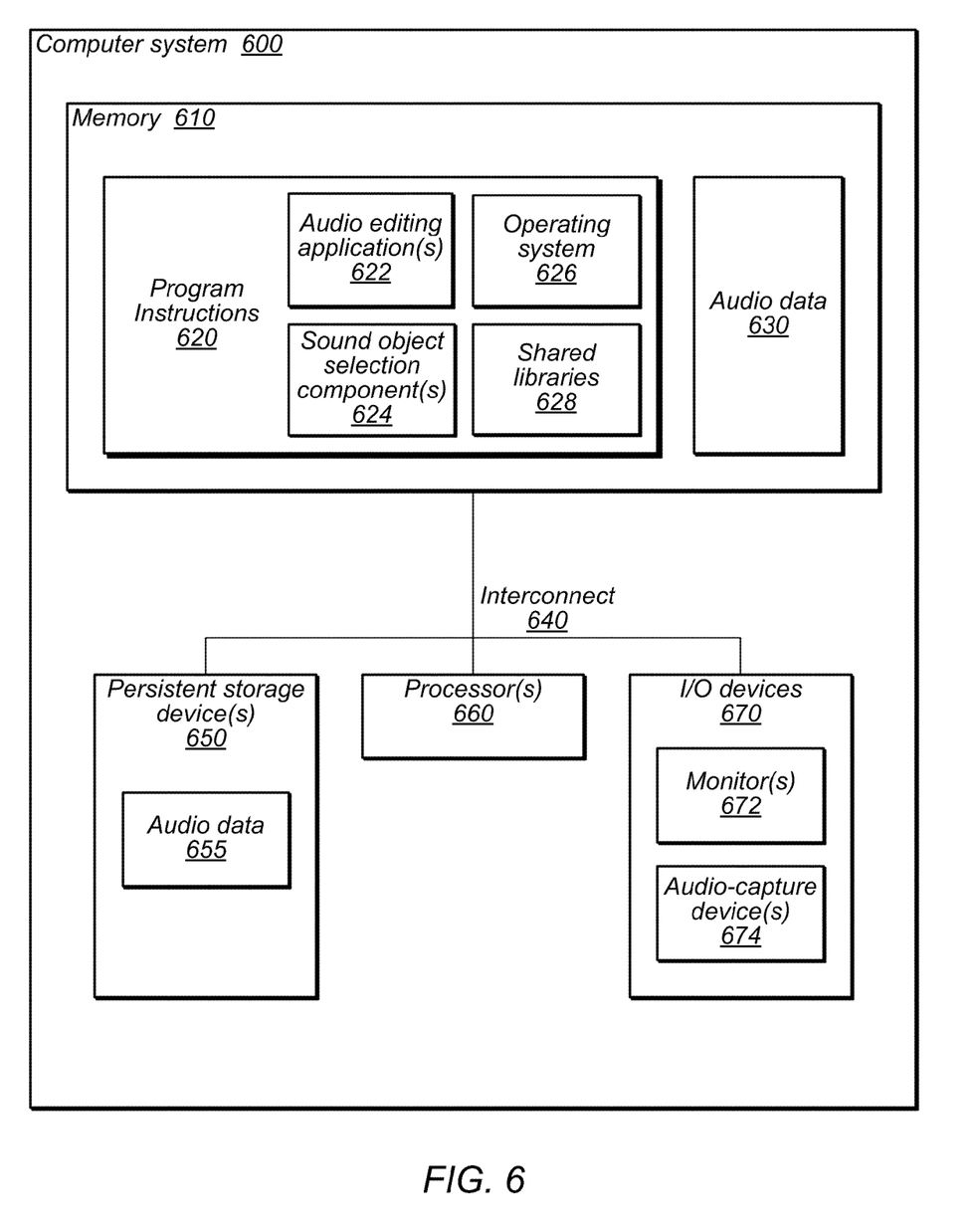
FIG. 6 illustrates a computer system configured to implement sound object-selection from sound mixtures as described herein, according to various embodiments.

FIG. 6 illustrates a computer system configured to implement sound object-selection from sound mixtures as described herein, according to various embodiments. The computer system 600 may be any of various types of devices, including, but not limited to, a personal computer system, desktop computer, laptop or notebook computer, mainframe computer system, handheld computer, workstation, network computer, a consumer device, application server, storage device, a peripheral device such as a switch, modem, router, etc, or in general any type of computing device.

The sound object selection components described herein may be provided as a computer program product, or software, that may include a computer-readable storage medium having stored thereon instructions, which may be used to program a computer system (or other electronic devices) to perform a process according to various embodiments. A computer-readable storage medium may include any mechanism for storing information in a form (e.g., software, processing application) readable by a machine (e.g., a computer). The computer-readable storage medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; electrical, or other types of medium suitable for storing program instructions. In addition, program instructions may be communicated using optical, acoustical or other form of propagated signal (e.g., carrier waves, infrared signals, digital signals, etc.)

A computer system 600 may include one or more processors 660, each of which may include multiple cores, any of which may be single or multi-threaded. The computer system 600 may also include one or more persistent storage devices 650 (e.g. optical storage, magnetic storage, hard drive, tape drive, solid state memory, etc), which may persistently store audio data 655.

Computer system 600 may further comprise any number of I/O devices, such as 670. For example, I/O devices 670 may include one or more monitors 672 for visualizing audio data and/or one or more audio-capture devices 674, such as microphones, for capturing audio data.

According to the illustrated embodiment, computer system 600 may include one or more memories 610 (e.g., one or more of cache, SRAM, DRAM, RDRAM, EDO RAM, DDR 10 RAM, SDRAM, Rambus RAM, EEPROM, etc.). The one or more processors 660, the storage device(s) 650, I/O devices 670, and the system memory 610 may be coupled to an interconnect 640. Various embodiments may include fewer or additional components not illustrated in FIG. 6 (e.g., video cards, audio cards, additional network interfaces, peripheral devices, a network interface such as an ATM interface, an Ethernet interface, a Frame Relay interface, etc.)

One or more of the system memories 610 may contain program instructions 620. Program instructions 620 may be encoded in platform native binary, any interpreted language such as Java™ byte-code, or in any other language such as C/C++, Java™, etc or in any combination thereof Program instructions 620 may include program instructions executable to implement one or more audio editing applications 622, sound object selection components 624, operating systems 626, and/or shared libraries 628. In some embodiments, audio editing applications 622 may utilize sound object selection components 624 to enable an object based interaction between a user and a input sound mixture, as described herein. In various embodiments, selection components 624 may be incorporated as part of audio editing application 622. In some embodiments, different software components may make use of shared libraries 628. For example, shared libraries 628 may include various mathematical libraries for solving equations and/or performing other mathematical computations that selection components 624 and/or audio editing applications 622 may need to perform, as described herein.

The system memory 610 may further comprise audio data 630, which may be interacted with using audio editing applications 622 and/or sound object selection components 624. System memory 610 may include other variables and/or data structures not pictured.

Although the embodiments above have been described in considerable detail, numerous variations and modifications will become apparent to those skilled in the art once the above disclosure is fully appreciated. For example, various functionalities may be implemented in hardware rather than in software components. In another example, a user may provide reference audio data by recording it or by providing pre-recorded audio data.

Although the example embodiments described herein primarily concern selecting sound from audio mixtures, given the benefit of this disclosure, one skilled in the art will appreciate that the techniques described herein may be generalized to select objects from arbitrary time-series data that may represent a mixture of input streams. Various techniques described herein may be leveraged for selecting components of video data, communications/network stream data, chemical/biological process time-series data, and/or of other time series data.

Numerous possibilities exist for using the disclosed techniques in various domains. For example, in chemistry, a measured chromatogram of chemical mixtures may comprise a mixture of spectra. Given a reference measurement, the techniques described herein may be used to allow a chemist to select and/or isolate various elements of this mixture.

In another example, the disclosed techniques may be used to select objects from network data. For example, modern computers send and receive network data belonging to a plurality of packet streams at the same time (e.g., communications to/from various applications). Therefore, the aggregate network data may be considered a mixture of various streams. According to some embodiments, a user may be able to select a target network stream by providing a reference, such as a reference activity template.

Examples from various other domains (e.g., selecting objects from video input) are also possible. It is intended that the following claims be interpreted to embrace all such variations and modifications.

What is claimed:
1. A computer-implemented method, comprising:
    receiving audio data comprising a sound mixture including a plurality of sound objects superimposed in time;
    receiving reference audio data of a reference sound object that corresponds along spectral and temporal dimensions to a target sound object of the plurality of sound objects; and
    analyzing both the sound mixture and the reference audio data to locate the target sound object from the plurality of sound objects in the sound mixture, said analyzing comprising:
        decomposing the reference audio data into a plurality of reference components; and
        decomposing the received audio data, dependent on the decomposed reference components, into a plurality of components.

2. The computer-implemented method of claim 1, wherein said decomposing the reference audio data is dependent on a PLCA model decomposition of the reference audio data.

3. The computer-implemented method of claim 1, wherein said decomposing the received audio data comprises performing an iterative Expectation-Maximization algorithm, one or more equations of the Expectation-Maximization algorithm being dependent, at least in part, on audio data corresponding to one or more of the reference components.

4. The computer-implemented method of claim 1, wherein the audio data comprises a time-frequency distribution.

5. The computer-implemented method of claim 1, further comprising re-synthesizing the target sound object from the one of the plurality of sound objects.

6. The computer-implemented method of claim 5, further comprising isolating the target sound object.

7. A non-transitory computer-readable storage medium storing program instructions executable by a processor to implement:
    receiving audio data comprising a sound mixture including a plurality of sound objects superimposed in time;
    receiving reference audio data of a reference sound object that corresponds along spectral and temporal dimensions to a target sound object of the plurality of sound objects; and
    analyzing both the sound mixture and the reference audio data to locate the target sound object from the plurality of sound objects of the sound mixture, said analyzing comprising:
        decomposing the reference audio data into a plurality of reference components; and
        decomposing the sound mixture, dependent on the decomposed reference components, into a plurality of components.

8. The non-transitory computer-readable storage medium of claim 7, wherein said decomposing the reference audio data is dependent on a PLCA model decomposition of the reference audio data.

9. The non-transitory computer-readable storage medium of claim 7, wherein said decomposing the sound mixture comprises performing an iterative Expectation-Maximization algorithm, one or more equations of the Expectation-Maximization algorithm being dependent, at least in part, on audio data corresponding to one or more of the reference components.

10. The non-transitory computer-readable storage medium of claim 7, further comprising re-synthesizing the target sound object from the one of the plurality of sound objects.

11. A system comprising:
    one or more processors;
    a memory coupled to the one or more processors and storing program instructions executable by the one or more processors to implement:

receiving audio data comprising a sound mixture including a plurality of sound objects superimposed in time;

receiving reference audio data of a reference sound object that corresponds along spectral and temporal dimensions to a target sound object of the plurality of sound objects; and analyzing both the sound mixture and the reference audio data to locate the target sound object from the plurality of sound objects in the sound mixture, said analyzing comprising:

decomposing the reference audio data into a plurality of reference components; and decomposing the received audio data, dependent on the decomposed reference components, into a plurality of components.

12. The system of claim 11, wherein said decomposing the received audio data comprises performing an iterative Expectation-Maximization algorithm, one or more equations of the Expectation-Maximization algorithm being dependent, at least in part, on audio data corresponding to one or more of the reference components.

13. The system of claim 11, further comprising re-synthesizing the target sound object from one of the plurality of sound objects.

14. A non-transitory computer-readable storage medium storing program instructions executable by a processor to implement:

receiving time-series data comprising an input mixture including a plurality of input data streams superimposed in time;

receiving reference time-series data of a reference data stream that corresponds along spectral and temporal dimensions to a target data stream of the plurality of input data streams; and analyzing both the input mixture and the reference time-series data to locate the target data stream from the plurality of input data streams of the input mixture, said analyzing comprising:

decomposing the reference time-series data into a plurality of reference components; and decomposing the input mixture, dependent on the decomposed reference components.

15. The non-transitory computer-readable storage medium of claim 14, wherein said decomposing the reference time-series data is dependent on a PLCA model decomposition of the reference time-series data.

16. The non-transitory computer-readable storage medium of claim 14, wherein said decomposing the input mixture comprises performing an iterative Expectation-Maximization algorithm, one or more equations of the Expectation-Maximization algorithm being dependent, at least in part, on data corresponding to one or more of the reference components.

17. The non-transitory computer-readable storage media of claim 7, wherein the audio data comprises a time-frequency distribution.

18. The non-transitory computer-readable storage media of claim 7, further comprising isolating the target sound object from the plurality of sound objects of the sound mixture.

19. The system of claim 11, wherein decomposing the reference audio data is dependent on a PLCA model decomposition of the reference audio data.

20. The system of claim 11, wherein the audio data comprises a time-frequency distribution.

* * * * *